United States Patent [19]

Johnson

[11] Patent Number: 4,811,173
[45] Date of Patent: Mar. 7, 1989

[54] REFRACTIVE APPARATUS FOR VEHICLES
[76] Inventor: James D. Johnson, P.O. Box 175, Churubusco, Ind. 46723
[21] Appl. No.: 138,302
[22] Filed: Dec. 28, 1987
[51] Int. Cl.$^4$ ............................................. B60Q 1/00
[52] U.S. Cl. .................................... 362/61; 116/28 R; 350/100; 350/612; 362/80; 362/190; 362/397
[58] Field of Search ...................... 362/61, 80, 83, 326, 362/382, 397, 398, 433; 116/28 R; 350/612, 615, 617, 618, 624, 97, 100

[56] References Cited
U.S. PATENT DOCUMENTS

| | | |
|---|---|---|
| 851,154 | 4/1907 | Blair . |
| 1,099,751 | 6/1914 | Kilburn . |
| 1,877,997 | 9/1932 | Shapiro et al. . |
| 1,905,323 | 4/1933 | Wallace . |
| 2,075,900 | 4/1937 | Jackson . |
| 2,084,627 | 6/1937 | Cabral . |
| 2,257,510 | 9/1941 | Mote . |
| 2,271,110 | 1/1942 | Webster .................. 350/100 |
| 2,483,202 | 9/1949 | Jackson . |
| 2,949,058 | 8/1960 | Daly . |
| 2,985,749 | 5/1961 | Johnson ...................... 362/80 |
| 3,485,555 | 12/1969 | Morris . |
| 3,704,063 | 11/1972 | Guthrie . |
| 3,744,885 | 7/1973 | Hurtado et al. . |
| 3,895,856 | 7/1975 | Bickel . |
| 4,221,498 | 9/1980 | Schueler et al. . |
| 4,252,409 | 2/1981 | Schwab . |
| 4,257,706 | 3/1981 | Smith .................. 116/28 R |
| 4,274,714 | 6/1981 | Okamura . |
| 4,405,973 | 9/1983 | Moscarillo ................ 362/190 |
| 4,413,364 | 11/1983 | Bittaker ................ 362/802 |
| 4,633,215 | 12/1986 | Anders ................ 116/28 R |
| 4,642,737 | 2/1987 | Meyers ................ 362/397 |

FOREIGN PATENT DOCUMENTS 3122948 12/1982 Fed. Rep. of Germany ...... 350/612
556266 2/1957 Italy .......................... 116/28 R Primary Examiner—Douglas Hart
Attorney, Agent, or Firm—George Pappas

[57] ABSTRACT

Reflective and refractive apparatuses are provided for reflecting or refracting light from the vehicle rear tail light so that it may readily be viewed by bystanders and through the use of the rear view mirror of the vehicle. The refractive apparatus includes a translucent body having an opening communicating with a cavity therein and adhesive on a rim portion surrounding the opening. The translucent member is attached to the vehicle tail light with the adhesive and light travels through the opening and cavity and out through the translucent member. The reflective apparatus includes a ferroalloy bracket and a mirror pivotally attached thereto through the use of a plate. The bracket is selectively detachably attached to a ferroalloy portion of the vehicle with a magnet.

13 Claims, 2 Drawing Sheets

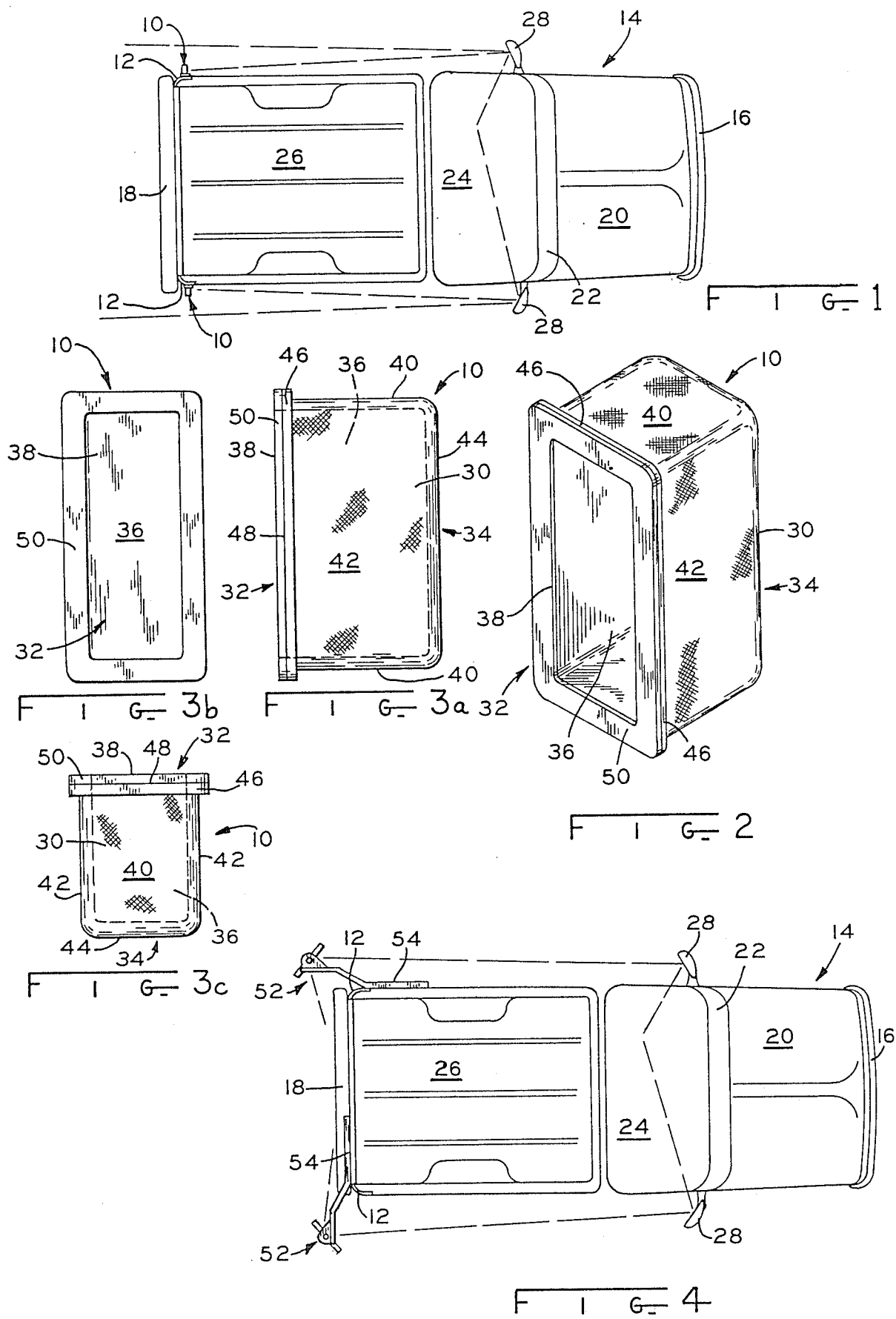

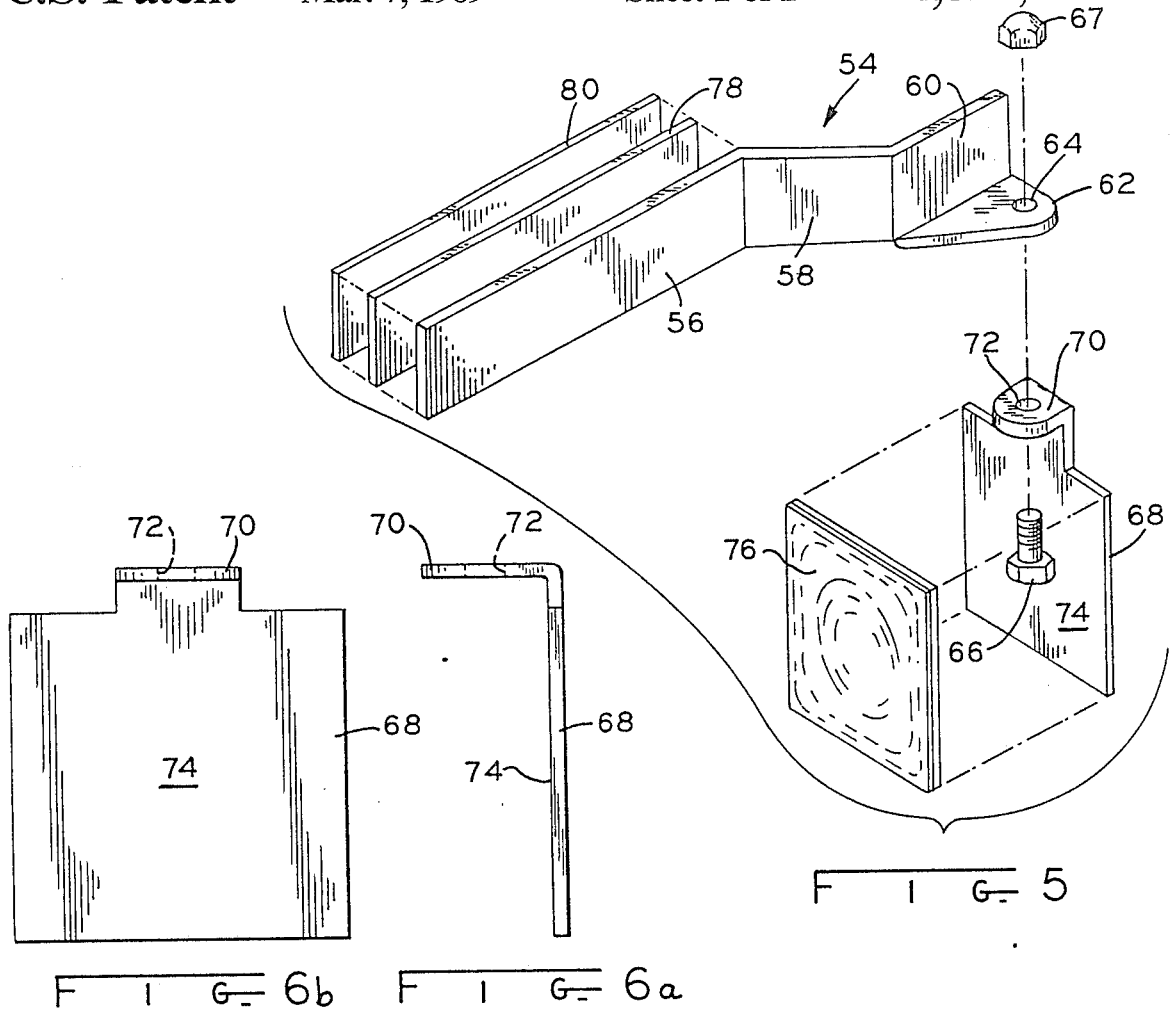
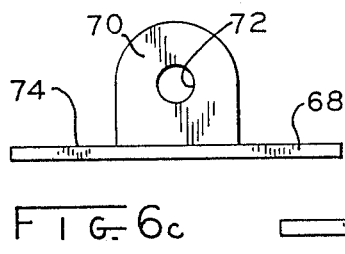
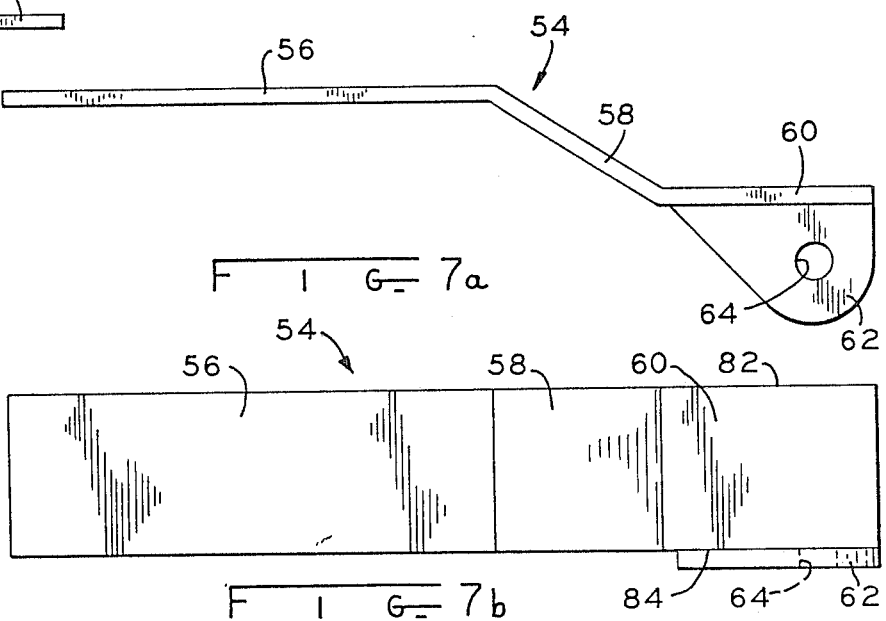
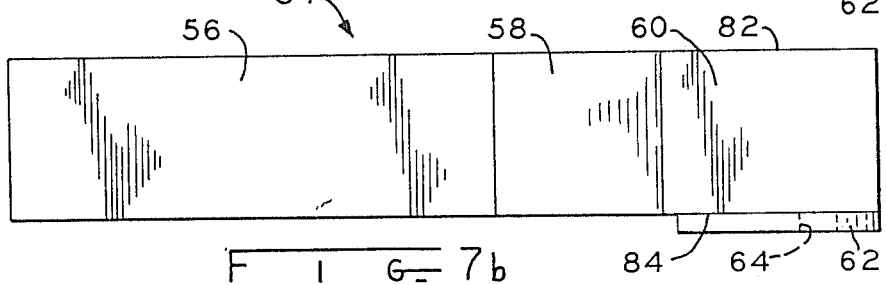

4,811,173

REFRACTIVE APPARATUS FOR VEHICLES

BACKGROUND OF THE INVENTION

The present invention relates to reflective and refractive apparatuses and, more particularly, to apparatuses for use on a vehicle for reflecting or refracting light from the vehicle rear tail light so that the same may readily be viewed through the use of the rear view mirror of the vehicle In vehicles, such as automobiles and trucks, tail lights are utilized at the rear thereof for the purpose of indicating when the driver of the vehicle is breaking and/or turning in a particular direction. These rear tail lights are operated through the use of a lightbulb situated inside of the rear tail light lens. Furthermore, the rear tail light lenses are sometimes manufactured to be visible only from the rear of the vehicle and, sometimes are manufactured to wrap around the rear corner of the vehicle and are somewhat L-shaped so that the rear tail light may be visible from the side and the back of the vehicle.

Often times, the rear tail light lightbulb burns out and the driver of the vehicle has no practical way of knowing that the rear lightbulb has burned out and that the rear light is not properly operating. There is no reason for the driver to suspect such a condition and he or she may drive the vehicle for thousands of miles prior to becoming aware of the condition. Most often, the driver becomes aware of the condition by another individual noticing the problem and mentioning the same, or by the driver actually conducting a test by himself or with another individual so as to determine whether the rear tail lights are operating. As can be appreciated, conducting such a test alone is substantially burdensome, in that, for example, the brake pedal must be retained depressed by some physical object while the driver walks around to the rear of the vehicle so as to inspect the same. Further, it is sometimes embarrassing and potentially costly when a driver, without knowledge of a rear tail light failure, is driving his vehicle and a policeman notices the situation and, thereafter, stops the driver so as to give him a warning and/or a ticket.

Furthermore, rear tail lights, and even the wrap around rear tail lights, are not substantially visible from a position generally forward and on the side of the vehicle thereof. That is, one standing at an intersection and looking at a vehicle approaching the intersection cannot generally see whether the rear tail lights, indicating breaking or turning, are being operated.

Apparatuses of the past have also generally been bulky and obtrusive and sometimes quite expensive to manufacture. Some of the apparatuses such as those shown in U.S. Pat. Nos. 2,483,202, 3,744,885, and 2,257,510 tend to be so obtrusive that they would get in the way during the washing of the vehicle.

Accordingly, a need exists for an apparatus or means through which a driver of a vehicle may easily determine whether the rear tail lights of his vehicle are properly operating. Further, a need exists for an apparatus or means for making the rear tail lights of a vehicle and the operation thereof more visible to an individual standing forward and on the side of the vehicle. Further yet, such an apparatus or means need be generally inexpensive to manufacture and practical in use so as not to be overly obtrusive and burdensome to the vehicle driver, for example, when washing the vehicle.

SUMMARY OF THE INVENTION

The reflective and refractive apparatuses, according to the present invention, are designed to overcome the above-discussed disadvantages associated with prior art apparatuses and to fulfill the existing needs thereof. In this regard, in one embodiment, a refractive apparatus is provided having a translucent body and an adhesive means for attaching the translucent body to a vehicle indicator light lens such as the rear tail light of a vehicle In another embodiment, a reflective apparatus includes a mirror attached to a bracket member made of a ferroalloy material and a magnet for detachably attaching the mirror and bracket to a ferroalloy portion of the vehicle.

More specifically, the first embodiment includes a translucent member or body having a light-receiving end and a light-exiting end and an opening on the light-receiving end communicating with a cavity in the member. The translucent member and cavity are substantially rectangularly box-shaped. An adhesive means such as double-face tape is provided on a rim portion surrounding the opening of the member for attaching the reflective apparatus to a vehicle wrap around tail light lens. The light from the vehicle tail light travels through the translucent member opening and through the cavity out through the translucent member exiting end thereby making the tail light visible to the driver through the rear view mirror on the side front portion of the vehicle and, further, making the tail light more visible to bystanders. The apparatus is substantially inexpensive to manufacture and, yet, is of sufficient strength to withstand the forces that it may be subjected to in that it is injection molded and made of a plastic and having walls of a proper thickness. Furthermore, the apparatus is of a size sufficiently small so as to be substantially visible yet not so large as to be overly obtrusive when washing the vehicle or walking therearound.

In the second embodiment, a bracket member made of a ferroalloy is provided and a plate portion is pivotally connected to the bracket whereon a convex-shaped mirror is attached for pivotal movement therewith. A magnet is used for selectively detachably attaching the bracket to a ferroalloy portion of the vehicle. For vehicles having non-ferrous bodies, double-face tape is provided for attaching the magnet to the non-ferrous portion of the vehicle and the bracket is selectively detachably connected thereto. By properly attaching the bracket and adjusting the pivot of the plate and mirror, the driver, through the rear view mirror on the front side portion of the vehicle, can readily see behind the vehicle and can also see the rear tail light so as to determine whether it is operating. Further, when the vehicle is being washed, such as through an automated car wash, or when the driver does not wish to utilize the apparatus, it is readily removable by pulling the bracket away from the vehicle and detaching the same from the magnet. Thereafter, the bracket can easily be reattached by placing the same near the magnet and allowing the magnet to pull and hold the bracket in place.

In one form thereof, a refracting apparatus is provided for attachment to a vehicle indicator light lens and for refracting light therefrom. The apparatus includes a translucent member having a light-receiving end and a light-exiting end and an adhesive is provided on the light-receiving end of the translucent member. The adhesive is situated between the translucent member and the lens, in attaching the member to the vehicle indicator lens, so that light therefrom may travel through the translucent member receiving end and out through the translucent member exiting end.

In one form thereof, a refractive apparatus is provided for attachment to a vehicle indicator light lens and for refracting light therefrom. The apparatus includes a translucent member having a light-receiving end and a light-exiting end and an opening on the light-receiving end communicating with a cavity in the member and extending towards the light-exiting end. A rim portion surrounds the openings and an adhesive means is attached to the rim portion for attaching the reflective apparatus to the vehicle indicator light lens. Light from the vehicle indicator light may travel through the translucent member opening on the receiving end through the cavity and out through the translucent member exiting end.

In one form thereof, a reflective apparatus is provided for viewing behind a vehicle through the use of a rear view mirror of the vehicle. The apparatus includes a bracket member made of a ferroalloy and a mirror attached to the bracket member. A magnet is provided for selectively detachably attaching the bracket to a ferroalloy portion of the vehicle.

BRIEF DESCRIPTION OF THE DRAWINGS

The above-mentioned and other features and objects of this invention and the manner of attaining them will become more apparent and the invention itself will be better understood by reference to the following description of embodiments of the invention taken in conjunction with the accompanying drawings wherein:

FIG. 1 is a top plan view of a motor vehicle and showing refractive apparatuses according to the present invention attached to the rear tail lights thereof;

FIG. 2 is a perspective view of a refractive apparatus shown in FIG. 1;

FIG. 3A is a side elevational view of the refractive apparatus shown in FIG. 2;

FIG. 3B is a front elevational view of the refractive apparatus shown in FIG. 2 and looking into the apparatus thereof;

FIG. 3C is a bottom plan view of the refractive apparatus shown in FIG. 2;

FIG. 4 is a top plan view of a vehicle and showing a reflective apparatuses in use according to the present invention;

FIG. 5 is a blown up perspective view of a reflective apparatus shown in FIG. 4;

FIG. 6A is a side elevational view of the plate utilized in the reflective apparatus shown in FIG. 5;

FIG. 6B is a front elevational view of the plate utilized in the reflective apparatus shown in FIG. 5;

FIG. 6C is a bottom plan view of the plate utilized in the reflective apparatus shown in FIG. 5;

FIG. 7A is a top plan view of the bracket utilized in the reflective apparatus shown in FIG. 5; and, FIG. 7B is a front plan view of the bracket utilized in the reflecting apparatus shown in FIG. 5.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

As shown in FIG. 1, one specific embodiment of the present invention is a refractive apparatus indicated as 10. One refractive apparatus 10 is attached to each of the wraparound tail light lenses 12 of vehicle 14. Vehicle 14 is a pick-up truck having a front bumper 16, back bumper 18, hood 20, windshield 22, cab top 24, and loading bed 26. Vehicle 14 further includes rear view mirrors 28 through which the driver can look toward the rear of the vehicle, as shown in dashed lines and, thereby, also readily see refractive apparatuses 10 attached to the respective wrap-around rear tail light lenses 12.

The refractive apparatus 10, as shown in FIGS. 2 and 3A–3C, includes a translucent member 30 having a light-receiving end generally indicated as 32 and a light-exiting end generally indicated as 34. Translucent member 30 is substantially rectangularly box-shaped defining a cavity 36 which is also substantially rectangularly box-shaped leading to and communicating with an opening 38. Opening 38 is substantially rectangular in shape. Translucent member 30 is formed by injection molding and is made of a substantially rigid plastic and having short sides 40, elongate sides 42, and back side 44. Sides 40, 42, and 44 are approximately one-eighth to one-half inch in thickness and are sufficiently thick to withstand forces which may be placed thereupon, for example, during washing. Furthermore, the translucent plastic which forms member 30 can be tinted any one of many colors, such as red or green.

A rim portion 46 surrounds opening 38 on light-receiving end 32 of translucent member 30. Rim portion 46 is integral with sides 40 and 42, and, sides 40 and 42 are integral with back side 44 as shown. Rim portion 46 includes a substantially flat area 48 upon which there is attached or placed an adhesive means or adhesive 50. Adhesive 50, as shown, comprises of double-faced tape which, on one side, attaches to flat area 48 of rim portion 46 and, on the other side thereof, attaches to a vehicle indicator light lens such as wrap around tail light lens 12. As can be appreciated, the operator need only peel away the adhesive tape protective portion and press member 30 against lens 12 so that member 30 may be attached thereto. Further, the other side of the double-face adhesive 50 is attached to the flat area 48 of rim portion 46 in the same fashion.

In operation, after member 30 is attached to lens 12, as described hereinabove, light transmitted by the tail lights and tail light lens 12 is received through the opening 38 of light-receiving end 32 and, thereafter, the light travels through the cavity 36 and translucent plastic sides 40, 42, and 44 on the light-exiting end 34 of member 30. Accordingly, the driver of vehicle 14 can readily see whether tail lights 12 are operating by glancing in the rear view mirrors 28. Further, bystanders, for example, located toward the front and side of vehicle 14, can also more easily see whether tail lights 12 are being operated through refractive apparatus 10.

In a second embodiment, as shown in FIG. 4, a reflective apparatus 52 is detachably selectively attached to vehicle 14 for viewing behind vehicle 14 and for viewing tail lights 12 through the use of rear view mirrors 28. More specifically, a driver of vehicle 14 can, through the use of rear view mirrors 28, look, as shown in dashed lines, not only toward the rear of vehicle 14 but also through the use of reflective apparatus 52 at the rear of vehicle 14 and at tail lights 12.

More specifically, as shown in FIGS. 5–7, reflective apparatus 52 includes a bracket member 54 made of a ferroalloy material. Bracket member 54 includes a substantially flat attaching portion 56 integrally connected with angled extension 58 which, in turn, is integrally connected with flat portion 60. Portions 56 and 60 are parallel with one another. A fin 62 is integrally connected with flat portion 60 and has a hole 64 therein. Hole 64 is adapted to receive mirror attachment bolt 66 and which is held therein via cap nut 67.

As shown in FIG. 5, mirror attachment bolt 66 is utilized to pivotally mount plate portion 68 to fin 62 of bracket member 54. Plate portion 68 includes leg portion 70 which is integral with plate portion 68 and situated substantially perpendicular thereto as shown. A hole 72 is provided on leg portion 70 and is adapted to receive bolt 66 as shown in FIG. 5 for attaching plate 68 to bracket member 54. It should be noted that leg portion 70 contacts fin 62 when tightened together via bolt 66 and cap nut 67 thus creating the frictional forces to retain plate portion 68 at a selective particular angle with respect to bracket 54.

Plate portion 68 includes substantially flat face 74 whereupon convex-shaped mirror 76 is attached through the use of an adhesive or other suitable means. Accordingly, mirror 76 is selectively pivotally situated with respect to bracket 54 by pivoting plate 68 as described hereinabove.

As shown in FIG. 5, a magnet means or magnet 78 is provided and being substantially flat and rectangular in shape. Magnet 78 is utilized for selectively detachably attaching bracket 54 to a ferroalloy portion of the vehicle 14 as shown in FIG. 4. That is, if the body of vehicle 14 is made of a ferroalloy material, magnet 78 is placed directly thereupon so that the magnet 78 draws itself and attaches to the body of vehicle 14. Thereafter, bracket 54 is placed onto magnet 78 whereby the magnet draws and attaches the bracket to the body of vehicle 14. In the alternative, magnet 78 can be permanently attached to flat attaching portion 56 of bracket 54 thereby providing a single bracket unit with a magnet 78 attached thereto for placing on a ferroalloy portion of the vehicle and attaching thereto. When the operator wishes to remove the reflective apparatus 52 from the vehicle, it is merely pulled away therefrom detaching the magnet 78 along with the reflective apparatus 52 from vehicle 14. Accordingly, through the use of magnet 78, reflective apparatus 52 is selectively detachably attached to a ferroalloy portion of vehicle 14.

In the event that vehicle 14 is made of non-ferroalloy material, such as fiberglass, an adhesive means or double-face tape 80 is provided whereby magnet 78 can be first attached to the non-ferroalloy portion of vehicle 14. Double-face tape 80, as shown, is substantially elongate and rectangularly-shaped. Accordingly, after attaching magnet 78 to vehicle 14, through the use of adhesive double-face tape 80, bracket 54 is selectively detachably attached to magnet 78 substantially as described hereinabove.

It should further be noted that fin 62 can be attached either to the upper edge 82 or lower edge 84 as shown in FIG. 7B thereby making a left-hand bracket or right-hand bracket as necessary for utilization on the different sides of vehicle 14.

As shown in FIG. 4, the rear of vehicle 14 and tail lights 12 are readily seen by glancing at rear view mirrors 28. Further, reflective apparatuses 52 are readily detachable from vehicle 14 when the operator does not wish to use them or when the vehicle is being washed through, for example, an automated car wash.

While the invention has been described as having specific embodiments, it will be understood that it is capable of further modifications. This application is, therefore, intended to cover any variations, uses or adaptations of the invention following the general prinnciples thereof and including such departures from the present disclosure as come within known or customary practice in the art to which this invention pertains and fall within the limits of the appended claims.

What is claimed is:

1. A refracting apparatus for attachment to a vehicle indicator light lens and for refracting light therefrom, said apparatus comprising:
   a translucent member having a light-receiving end and a light-exiting end;
   an adhesive on said light-receiving end of said translucent member; and,
   wherein said adhesive is situated between said member and the lens in attaching said member to the vehicle indicator lens so that light therefrom may travel through said translucent member receiving end and out through said translucent member exiting end.

2. The refractive apparatus of claim 1 wherein said translucent member has an opening on said light-receiving end communicating with a cavity in said member and extending towards said light-exiting end so that light may travel through said opening and cavity and out through said translucent member exiting end.

3. The refractive apparatus of claim 2 further comprising a rim portion connected to said member and surrounding said opening whereat said adhesive is located.

4. The refractive apparatus of claim 3 wherein said adhesive comprises double-face tape.

5. The refractive apparatus of claim 3 wherein said translucent member is substantially rectangularly box-shaped and having a substantially rectangularly box-shaped cavity and substantially rectangularly-shaped opening.

6. The refractive apparatus of claim 3 wherein said translucent member is formed by injection molding and is made of plastic material.

7. The refractive apparatus of claim 4 wherein said refractive apparatus is attached to a vehicle rear tail light lens.

8. The refractive apparatus of claim 1 wherein said adhesive comprises double-face tape.

9. The refractive apparatus of claim 1 wherein said translucent member is formed by injection molding and is made of plastic material.

10. A refractive apparatus for attachment to a vehicle indicator light lens and for refracting light therefrom, said apparatus comprising:
    a translucent member having a light-receiving end and a light-exiting end, an opening on said light-receiving end communicating with a cavity in said member and extending towards said light-exiting end;
    a rim portion connected to said translucent member and surrounding said opening;
    adhesive means attached to said ri- portion for attaching the reflective apparatus to the vehicle indicator light lens; and, wherein light from the vehicle indicator light travels through said translucent member opening on said receiving end through said cavity and out through said translucent member exiting end.

11. The refractive apparatus of claim 10 wherein said adhesive means comprises double-faced tape.

12. The refractive apparatus of claim 10 wherein said translucent member is substantially rectangularly box-shaped and said cavity is substantially rectangularly box-shaped and wherein said opening is substantially rectangular.

13. The refractive apparatus of claim 12 wherein said translucent member is formed by injection molding and is made of plastic.

* * * * *

UNITED STATES PATENT AND TRADEMARK OFFICE
CERTIFICATE OF CORRECTION

PATENT NO. : 4,811,173
DATED : March 7, 1989
INVENTOR(S) : James D. Johnson

It is certified that error appears in the above-identified patent and that said Letters Patent is hereby corrected as shown below:

Col. 2, line 10, insert "." after "vehicle".

Col. 6, line 66, change "ri-" to --rim--.

Signed and Sealed this

Twenty-second Day of August, 1989

Attest:

DONALD J. QUIGG

*Attesting Officer*      *Commissioner of Patents and Trademarks*